United States Patent
Rho et al.

(10) Patent No.: US 9,417,481 B2
(45) Date of Patent: Aug. 16, 2016

(54) LIQUID CRYSTAL DISPLAY

(71) Applicant: Samsung Display Co., Ltd., Yongin (KR)

(72) Inventors: Soon Joon Rho, Suwon-si (KR); Kyung Min Kim, Seoul (KR); Jin-Lak Kim, Osan-si (KR); Hye Lim Jang, Yongin-si (KR); Keun Chan Oh, Cheonan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 254 days.

(21) Appl. No.: 14/143,481

(22) Filed: Dec. 30, 2013

(65) Prior Publication Data
US 2015/0042915 A1 Feb. 12, 2015

(30) Foreign Application Priority Data
Aug. 7, 2013 (KR) ........................ 10-2013-0093658

(51) Int. Cl.
G02F 1/1337 (2006.01)
G02F 1/1343 (2006.01)
G02F 1/1333 (2006.01)
G02F 1/1362 (2006.01)

(52) U.S. Cl.
CPC .. G02F 1/1337 (2013.01); *G02F 2001/133357* (2013.01); *G02F 2001/133742* (2013.01); *G02F 2001/134345* (2013.01); *G02F 2001/136222* (2013.01)

(58) Field of Classification Search
None
See application file for complete search history.

(56) References Cited

U.S. PATENT DOCUMENTS 5,699,133 A * 12/1997 Furuta .................... G02C 7/101
348/E13.04
8,064,017 B2 * 11/2011 Kurasawa ............. G02F 1/1337
349/123

(Continued)

FOREIGN PATENT DOCUMENTS

| JP | 05-061047 | 3/1993 |
| JP | 09-043560 | 2/1997 |

(Continued)

OTHER PUBLICATIONS

Cheol Jang and Kyung Cheol Choi, "An Investigation of the Temporal Dark-Image-Sticking Phenomenon in an AC Plasma Display Panel with an Auxiliary Electrode," IEEE Transactions on Plasma Science, vol. 28, No. 2, Feb. 2010.*

(Continued)

*Primary Examiner* — Ryan Crockett
(74) *Attorney, Agent, or Firm* — H.C. Park & Associates, PLC

(57) ABSTRACT

A liquid crystal display, including: a first insulation substrate; a gate line and a data line positioned on the first insulation substrate and crossing each other; a first passivation layer positioned on the gate line and the data line; a pixel electrode positioned on the first passivation layer; an alignment layer positioned on the pixel electrode; a second insulation substrate facing the first insulation substrate; and a liquid crystal positioned between the first insulation substrate and the second insulation substrate. A thickness of the alignment layer is larger than a thickness of the pixel electrode.

12 Claims, 6 Drawing Sheets

(56) References Cited

U.S. PATENT DOCUMENTS

| | | | |
|---|---|---|---|
| 8,199,290 B2* | 6/2012 | Huh | G02F 1/0045 |
| | | | 252/299.01 |
| 8,366,504 B2 | 2/2013 | Matsumoto et al. | |
| 2005/0062921 A1* | 3/2005 | Gao | G02F 1/133734 |
| | | | 349/130 |
| 2012/0147282 A1* | 6/2012 | Shin | G02F 1/13624 |
| | | | 349/38 |
| 2012/0224128 A1* | 9/2012 | Jung | G02F 1/134309 |
| | | | 349/129 |
| 2012/0293736 A1* | 11/2012 | Jung | G09G 3/2074 |
| | | | 349/37 |
| 2013/0194536 A1* | 8/2013 | Tae | G02F 1/133707 |
| | | | 349/143 |
| 2014/0104532 A1* | 4/2014 | Cho | G02F 1/133377 |
| | | | 349/46 |

FOREIGN PATENT DOCUMENTS

| | | |
|---|---|---|
| JP | 10-039283 | 2/1998 |
| KR | 10-0900544 | 5/2009 |

OTHER PUBLICATIONS

Detlef Pauluth, "Adavanced liquid crystals for television", Journal of Materials Chemistry, Mar. 19, 2004, pp. 1219-1227.

LG Electronics USA, Inc., "LG Electronics Unveils New Outdoor Display, Offering Total Solution for Public Spaces", red Orbit, Jun. 14, 2012.

* cited by examiner

LIQUID CRYSTAL DISPLAY

CROSS-REFERENCE TO RELATED APPLICATION

This application claims priority to and the benefit of Korean Patent Application No. 10-2013-0093658, filed in the Korean Intellectual Property Office on Aug. 7, 2013, the entire contents of which are incorporated herein by reference.

BACKGROUND

1. Field

Aspects of the present invention relate to a liquid crystal display.

2. Discussion of the Background

A liquid crystal display which is one of the most common types of flat panel displays currently in use and includes two sheets of display panels with field generating electrodes such as a pixel electrode, a common electrode, and the like, and a liquid crystal layer interposed therebetween. The liquid crystal display generates an electric field in the liquid crystal layer by applying a voltage to the field generating electrodes, and determines the direction of liquid crystal molecules of the liquid crystal layer by the generated electric field, thus controlling polarization of incident light to display images.

Among the liquid crystal displays, a vertically aligned mode liquid crystal display, in which liquid crystal molecules are aligned so that long axes thereof are vertical to lower and upper display panels when the electric field is not applied, offers a high contrast ratio and a wide reference viewing angle.

In order to implement a wide viewing angle in such a vertically aligned mode liquid crystal display, a plurality of domains having different alignment directions of the liquid crystal may be formed in one pixel. To form the domains, minute slits can be formed in the field generating electrode or protrusions can be formed on the field generating electrode. The domains may be formed by the above methods, by aligning the liquid crystal in a vertical direction with respect to a fringe field formed between an edge of the cutout or the protrusion and the field generating electrode facing the edge.

Since the liquid crystal display uses the liquid crystal layer having a high phase transition temperature, there are problems in that a response speed and black luminance may be increased. Further, the liquid crystal layer may cause a decreased contrast ratio, since the black luminance is increased in the vertically aligned mode.

The above information disclosed in this Background section is only for enhancement of understanding of the background of the invention and therefore it may contain information that does not form the prior art that is already known in this country to a person of ordinary skill in the art.

SUMMARY

Aspects of the present invention provide a liquid crystal display having an excellent contrast ratio when driven in a vertically aligned mode.

Additional features of the invention will be set forth in the description which follows, and in part will be apparent from the description, or may be learned by practice of the invention.

An exemplary embodiment of the present invention provides a liquid crystal display, including: a first insulation substrate; a gate line and a data line positioned on the first insulation substrate and crossing each other; a first passivation layer positioned on the gate line and the data line; a pixel electrode positioned on the first passivation layer; an alignment layer positioned on the pixel electrode; a second insulation substrate facing the first insulation substrate; and a liquid crystal layer positioned between the first insulation substrate and the second insulation substrate. A thickness of the alignment layer is larger than a thickness of the pixel electrode.

In the liquid crystal display according to the exemplary embodiment of the present invention, it is possible to prevent degradation of a black luminance, when a liquid crystal layer having a high phase transition temperature is used and to provide an excellent contrast ratio.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Figure 1:
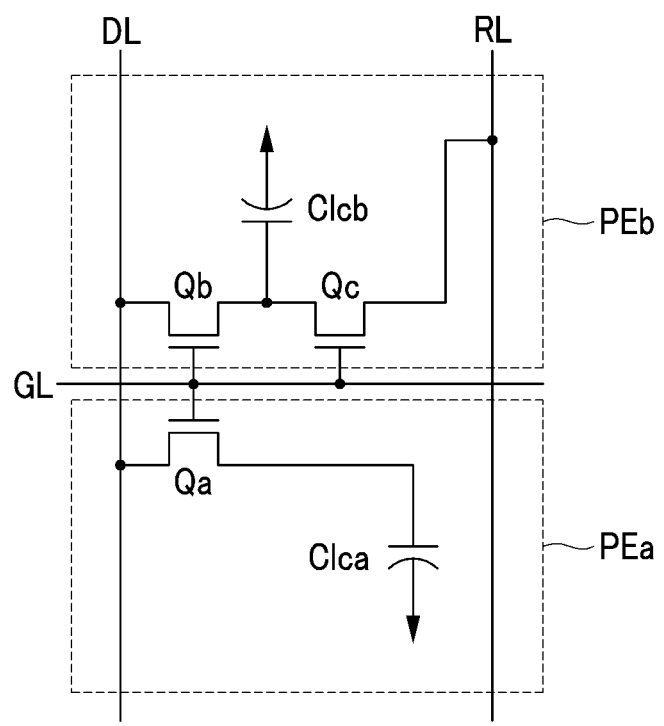
FIG. 1 is a circuit diagram illustrating a liquid crystal display, according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is an equivalent circuit diagram of one pixel PX of a liquid crystal display, according to an exemplary embodiment of the present invention. Referring to FIG. 1, the pixel PX includes a plurality of signal lines, including a gate line GL transferring a gate signal, a data line DL transferring a data signal, and a divided reference voltage line RL transferring a divided reference voltage. The pixel PX also includes first, second, and third switching elements Qa, Qb, and Qc connected to the signal lines, and first and second liquid crystal capacitors Clca and Clcb.

The first and second switching elements Qa and Qb are connected to the gate line GL and the data line DL, respectively. The third switching element Qc is connected to an output terminal of the second switching element Qb and the divided reference voltage line RL.

The first switching element Qa and the second switching element Qb are three-terminal elements, such as a thin film transistor, and control terminals thereof are connected to the gate line GL, input terminals thereof are connected to the data line DL. An output terminal of the first switching element Qa is connected to the first liquid crystal capacitor Clca. An output terminal of the second switching element Qb is connected to the second liquid crystal capacitor Clcb and the input terminal of the third switching element Qc.

The third switching element Qc is also a three-terminal element such as a thin film transistor. The third switching element Qc includes a control terminal connected to the gate line GL, an input terminal connected to the second liquid crystal capacitor Clcb, and an output terminal connected to the divided reference voltage line RL.

When a gate-on signal is applied to the gate line GL, the first switching element Qa, the second switching element Qb, and the third switching element Qc, which are connected to the gate line GL, are turned on. As a result, the data voltage applied to the data line DL is applied to a first subpixel electrode PEa and a second subpixel electrode PEb, through the turned-on first switching element Qa and second switching element Qb. In this case, the data voltages applied to the first subpixel electrode PEa and the second subpixel electrode PEb are the same as each other, and the first liquid crystal capacitor Clca and the second liquid crystal capacitor Clcb are charged at the same voltage, by a difference between the common voltage and the data voltage. Simultaneously, the charged voltage in the second liquid crystal capacitor Clcb is divided through the turned-on third switching element Qc.

As a result, a charged voltage value in the second liquid crystal capacitor Clcb is decreased by a difference between the common voltage and the divided reference voltage. That is, the charged voltage in the first liquid crystal capacitor Clca is higher than the charged voltage in the second liquid crystal capacitor Clcb.

As such, the charged voltage in the first liquid crystal capacitor Clca and the charged voltage in the second liquid crystal capacitor Clcb are different from each other. Since the voltage of the first liquid crystal capacitor Clca and the voltage of the second liquid crystal capacitor Clcb are different from each other, tilt angles of liquid crystal molecules in the first subpixel and the second subpixel are different from each other. As a result, the luminance of two subpixels varies. Accordingly, when the voltage of the first liquid crystal capacitor Clca and the voltage of the second liquid crystal capacitor Clcb are appropriately controlled, an image viewed from the side may be as close as possible to an image viewed from the front, thereby improving side visibility.

In the illustrated exemplary embodiment, in order to vary the charged voltage in the first liquid crystal capacitor Clca and the charged voltage in the second liquid crystal capacitor Clcb, the third switching element Qc connected to the second liquid crystal capacitor Clcb and the divided reference voltage line RL are included. According to another exemplary embodiment of the present invention, the second liquid crystal capacitor Clcb may be connected to a step-down capacitor. In detail, the third switching element including a first terminal connected to a step-down gate line, a second terminal connected to the second liquid crystal capacitor Clcb, and a third terminal connected to the step-down capacitor is included. As a result, some voltage charged in the second liquid crystal capacitor Clcb is charged in the step-down capacitor, thereby differently setting charged voltages between the first liquid crystal capacitor Clcb and the second liquid crystal capacitor Clcb.

Further, in the case of a liquid crystal display according to another exemplary embodiment of the present invention, the first liquid crystal capacitor Clcb and the second liquid crystal capacitor Clcb are connected to different data lines, to receive different data voltages. As a result, different voltages may be stored in the first liquid crystal capacitor Clca and the second liquid crystal capacitor Clcb. However, the voltages of the first liquid crystal capacitor Clca and the second liquid crystal capacitor Clcb may be differently set by various other methods.

Figure 2:
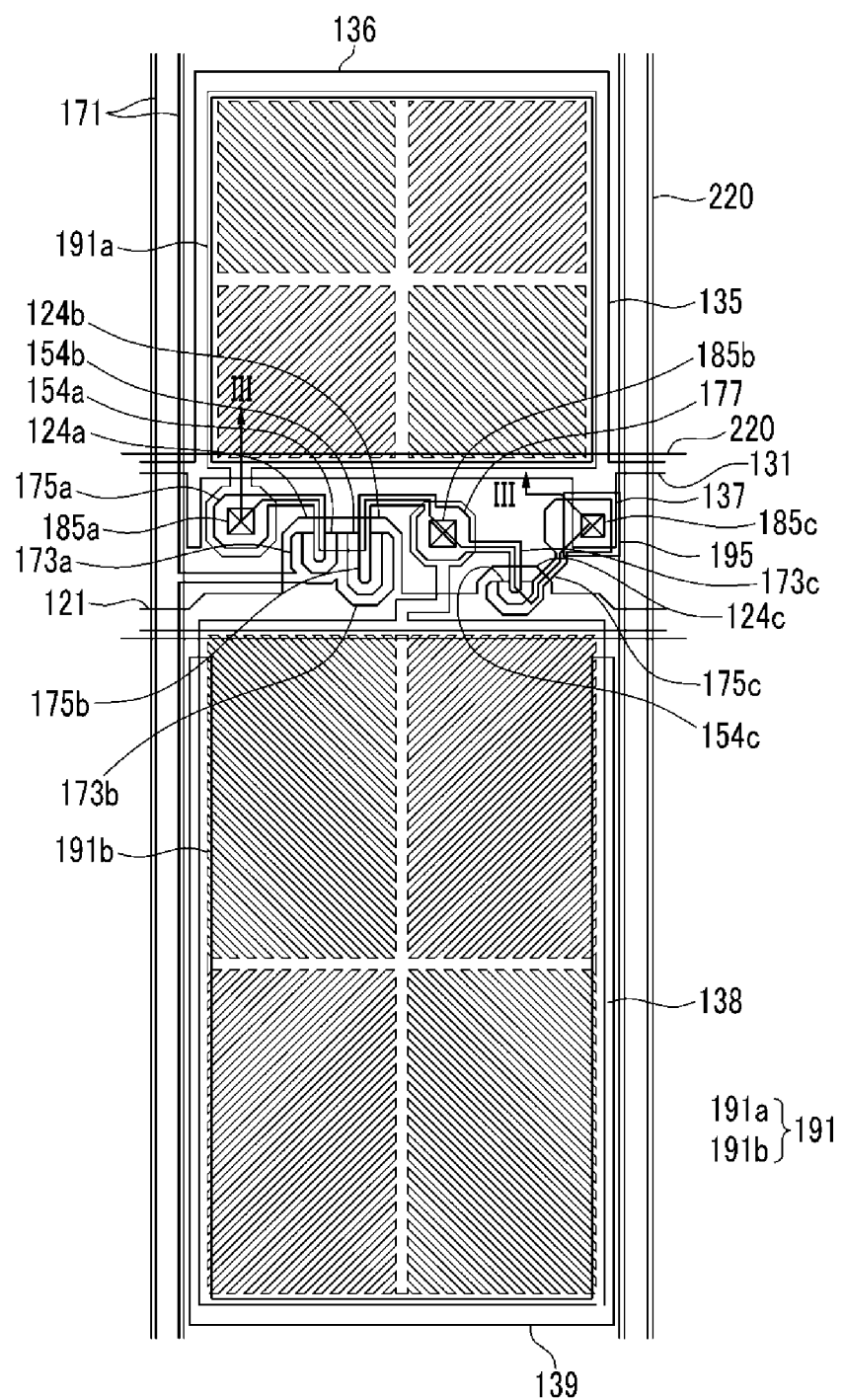
FIG. 2 is a layout view of an example of one pixel of the liquid crystal display, according to the exemplary embodiment of the present invention.
Figure 3:
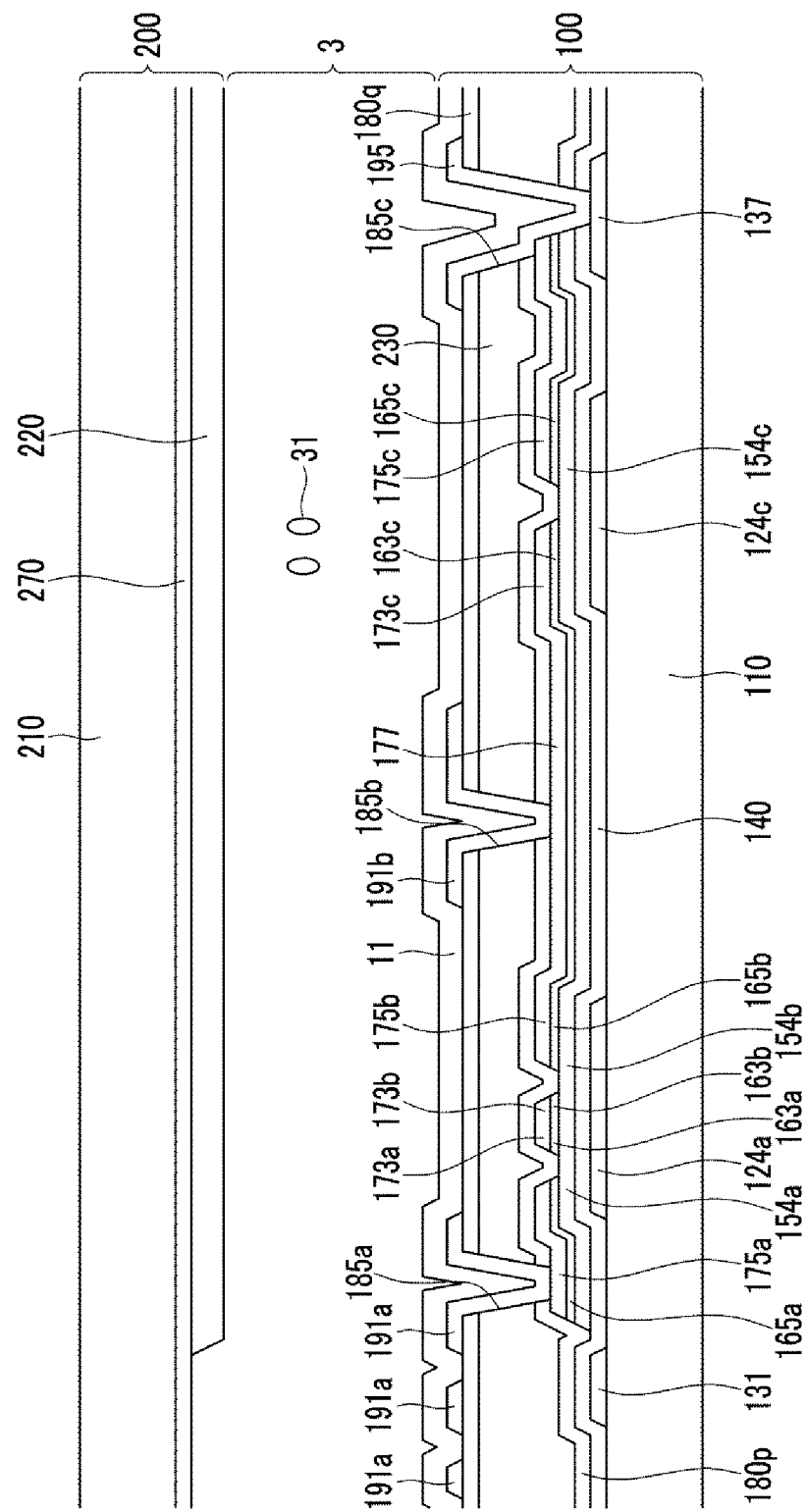
FIG. 3 is a cross-sectional view illustrating the liquid crystal display of FIG. 2 taken along line III-III.
Figure 4:
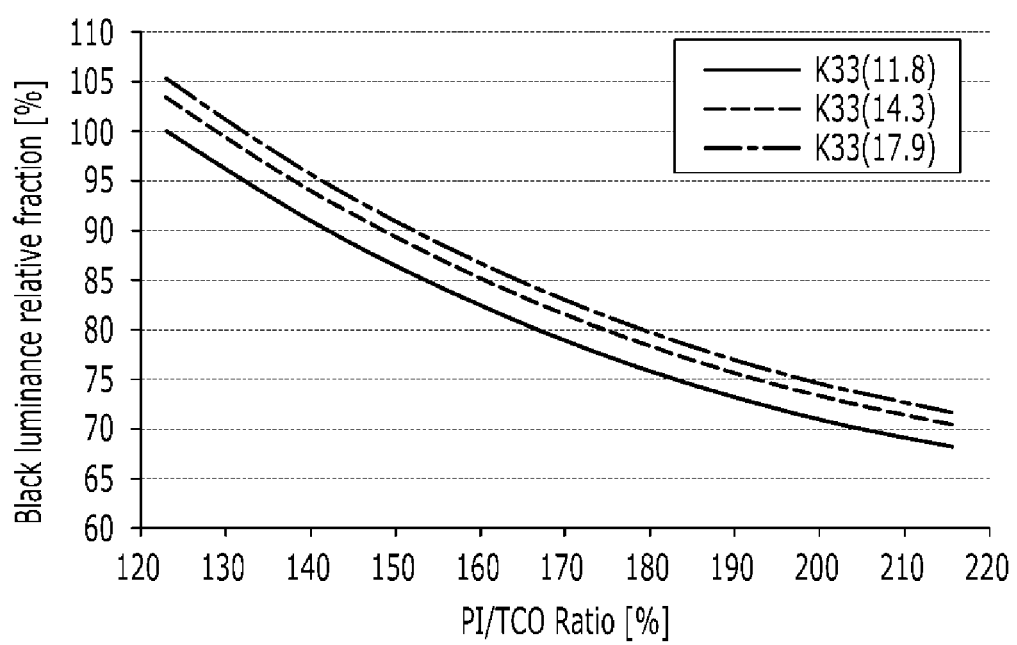
FIG. 4 is a graph of a black luminance relative fraction for a thickness ratio of an alignment layer to a pixel electrode, according to an exemplary embodiment of the present invention.
Figure 5:
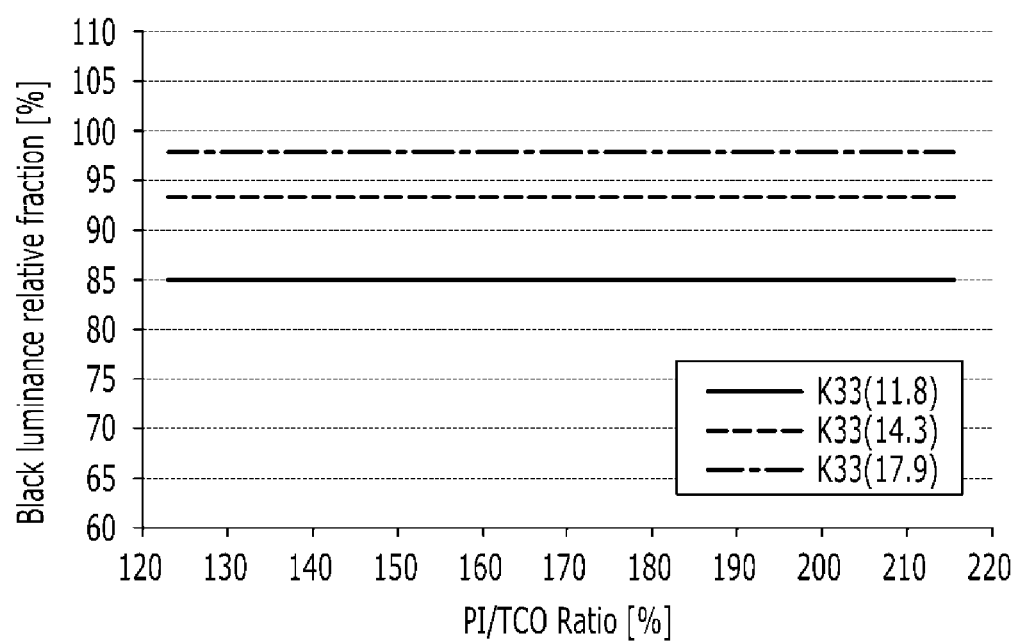
FIG. 5 is a graph for a liquid crystal property having each elastic coefficient for a thickness ratio of an alignment layer to a pixel electrode, according to an exemplary embodiment of the present invention.
Figure 6:
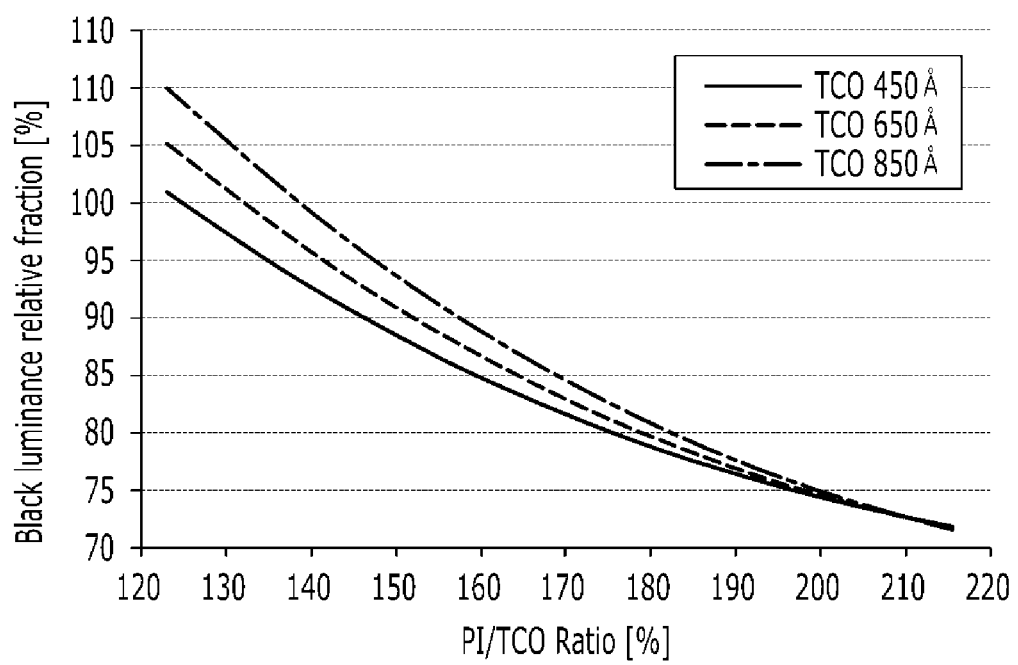
FIG. 6 is a graph of a black luminance relative fraction for each thickness of a pixel electrode, according to an exemplary embodiment of the present invention.

Next, a structure of the liquid crystal display illustrated in FIG. 1 will be described with reference to FIGS. 2 to 6. FIG. 2 is a layout view of an example of one pixel of the liquid crystal display, and FIG. 3 is a cross-sectional view illustrating the liquid crystal display of FIG. 2 taken along line III-III. FIG. 4 is a graph of a black luminance relative fraction for a thickness ratio of an alignment layer to a pixel electrode, according to an exemplary embodiment of the present invention. FIG. 5 is a graph for a liquid crystal property having each elastic coefficient for a thickness ratio of an alignment layer to a pixel electrode, according to an exemplary embodiment of the present invention. FIG. 6 is a graph of a black luminance relative fraction for each thickness of a pixel electrode, according to the exemplary embodiment of the present invention.

First, referring to FIGS. 2 and 3, the liquid crystal display includes a lower panel 100, an opposing upper panel 200, a liquid crystal layer 3 interposed between the two panels 100 and 200, and a pair of polarizers (not illustrated) attached to outer sides of the panels 100 and 200.

First, the lower panel 100 will be described. A gate conductor including a gate line 121 and a divided reference voltage line 131 is formed on an insulation substrate 110 made of transparent glass or plastic. The gate line 121 includes a first gate electrode 124a, a second gate electrode 124b, a third gate electrode 124c, and a wide end portion (not illustrated) for connection with another layer or an external driving circuit.

The divided reference voltage line 131 includes first storage electrodes 135 and 136, and a reference electrode 137. Second storage electrodes 138 and 139, which are not connected to the divided reference voltage line 131, are overlapped with the second subpixel electrode 191b.

A gate insulating layer 140 is formed on the gate line 121 and the divided reference voltage line 131. A first semiconductor 154a, a second semiconductor 154b, and a third semiconductor 154c are positioned on the gate insulating layer 140. Ohmic contacts 163a, 165a, 163b, 165b, 163c, and 165c are positioned on the semiconductors 154a, 154b, and 154c.

A data conductor including data lines 171, including a first source electrode 173a and a second source electrode 173b, a first drain electrode 175a, a second drain electrode 175b, a third source electrode 173a, and a third drain electrode 175c, is positioned on the ohmic contacts 163a, 165a, 163b, 165b, 163c, and 165c and the gate insulating layer 140.

The data conductor, the semiconductor positioned below the data conductor, and the ohmic contact may be simultaneously formed by using one mask. The data line 171 includes a wide end portion (not illustrated) for connection with another layer or an external driving circuit.

The first gate electrode 124a, the first source electrode 173a, and the first drain electrode 175a form a first thin film transistor (TFT) Qa together with a first semiconductor island 154a. A channel of the thin film transistor is formed in the semiconductor 154a between the first source electrode 173a and the first drain electrode 175a. Similarly, the second gate electrode 124b, the second source electrode 173b, and the second drain electrode 175b form a second thin film transistor Qb together with a second semiconductor island 154b. A channel is formed in the semiconductor 154b between the second source electrode 173b and the second drain electrode 175b. The third gate electrode 124c, the third source electrode 173c, and the third drain electrode 175c form a third thin film transistor Qc together with the third semiconductor island 154c. A channel is formed in the semiconductor 154c between the third source electrode 173c and the third drain electrode 175c.

The second drain electrode 175b includes an extension 177 connected to the third source electrode 173c and widely extended. On the data conductor (171, 173c, 175a, 175b, and 175c) and the exposed portion of the semiconductors 154a, 154b, and 154c, a first passivation layer 180p is positioned. The first passivation layer 180p may include an inorganic insulating layer made of silicon nitride, silicon oxide, or the like. The first passivation layer 180p may prevent a pigment of the color filter 230 from flowing into the exposed portion of the semiconductor 154a, 154b, and 154c.

The color filter 230 is positioned on the first passivation layer 180p. The color filter 230 extends in a vertical direction along two adjacent data lines.

A second passivation layer 180q is positioned on the color filter 230. The second passivation layer 180q may include an inorganic insulating layer made of silicon nitride, silicon oxide, or the like. The second passivation layer 180q prevents the color filter 230 from being lifted, and suppresses contamination of the liquid crystal layer 3 by an organic material such as a solvent flowing into from the color filter 230 to prevent defects such as an afterimage which may be caused when a screen is driven.

In the first passivation layer 180p and the second passivation layer 180q, a first contact hole 185a and a second contact hole 185b exposing the first drain electrode 175a and the second drain electrode 175b are formed. In the first passivation layer 180p and the second passivation layer 180q, and the gate insulating layer 140, a third contact hole 185c is formed that exposes a part of the reference electrode 137 and a part of the third drain electrode 175c. The third contact hole 185c is covered by a connecting member 195. The connecting member 195 electrically connects the reference electrode 137 and the third drain electrode 175c exposed by the third contact hole 185c.

Pixel electrodes 191 are positioned on the second passivation layer 180q. Each pixel electrode 191 includes the first subpixel electrode 191a and the second subpixel electrode 191b, which are separated from each other with the gate line 121 therebetween. The pixel electrodes 191 are adjacent to each other in a column direction based on the gate line 121. The pixel electrode 191 may be made of a transparent conductive material such as ITO or IZO. The pixel electrode 191 may be made of a reflective metal such as aluminum, silver, chromium, or an alloy thereof.

The first subpixel electrode 191a and the second subpixel electrode 191b are physically and electrically connected to the first drain electrode 175a and the second drain electrode 175b, through the first contact hole 185a and the second contact hole 185b, respectively. The first subpixel electrode 191a and the second subpixel electrode 191b receive data voltages from the first drain electrode 175a and the second drain electrode 175b. In this case, a part of the data voltage applied to the second drain electrode 175b is divided through the third source electrode 173c. As a result, a magnitude of the voltage applied to the first subpixel electrode 191a is larger than a magnitude of the voltage applied to the second subpixel electrode 191b.

The first subpixel electrode 191a and the second subpixel electrode 191b to which the data voltages are applied generate an electric field together with a common electrode 270 of the upper panel 200, to determine directions of the liquid crystal molecules of the liquid crystal layer 3 between the two electrodes 191 and 270. Luminance of light passing through the liquid crystal layer 3 varies according to the determined directions of the liquid crystal molecules.

A lower alignment layer 11 is positioned on the pixel electrode. The lower alignment layer 11 may be formed by a vertical alignment layer, and be made of alignment materials such as polyamic acid, polysiloxane, and polyimide.

A thickness ratio of the lower alignment layer to the pixel electrode may be an important consideration. The thickness ratio of the lower alignment layer to the pixel electrode may be about 1.4 to about 2.0. As the thickness ratio is increased, black luminance of the liquid crystal display is reduced. When the ratio is 2.0 or more, black luminance reduction is slight.

A thickness of the pixel electrode 191 may be about 450 Å. When the thickness of the pixel electrode is reduced, the thickness ratio of the lower alignment layer to the pixel electrode is increased. Particularly, the pixel electrode having the thickness of 450 Å is effective in the case where the thickness ratio of the alignment layer to the pixel electrode is fixed, for example, when the thickness ratio is about 1.2.

Next, the upper panel 200 will be described. A common electrode 270 is positioned on an insulation substrate 210. An upper alignment layer (not illustrated) is positioned on the common electrode 270 and may be a vertical alignment layer.

A light blocking member 220 is positioned on the common electrode 270. The light blocking member 220 positioned on the upper substrate 200 is described and illustrated. However, the present invention is not limited thereto. For example, the light blocking member 220 may be positioned on the lower substrate 100.

The light blocking member 220 is extended along the data line 171 and positioned between two adjacent color filters 230. A width of the light blocking member 220 may be larger than a width of the data line 171. As a result, the light blocking member 220 may prevent light incident from the outside from being reflected on the surface of the data line 171. Accordingly, light is not reflected on the surface of the data line 171. Thus, reflected light does not interfere with light passing through the liquid crystal layer 3. As a result, it is possible to prevent a contrast ratio of the liquid crystal display from being reduced.

The liquid crystal layer 3 has negative dielectric anisotropy. The liquid crystal molecules of the liquid crystal layer 3 are aligned so that long axes thereof are vertical to the surfaces of the two panels 100 and 200, when an electric field is not applied. The liquid crystal layer 3 may be made of a liquid crystal material having a large length to width ratio and a high phase transition temperature. An elastic coefficient $K_{33}$ of the liquid crystal layer increases by using such a material, and black luminance increases in the liquid crystal display using a liquid crystal layer that has a large elastic coefficient value, as illustrated in Table 1.

TABLE 1

|  | First liquid crystal (° C.) | Second liquid crystal (° C.) | Second liquid crystal/ First liquid crystal |
|---|---|---|---|
| Phase transition temperature | 85 | 110 | — |
| Elastic coefficient at 30° C. | 14.3 | 17.9 | 1.25 |
| Black luminance | 0.14 | 0.16 | 1.14 |

Accordingly, exemplary embodiments of the present invention provide a vertically aligned mode liquid crystal display has a low contrast ratio as the black luminance increases. In detail, in the liquid crystal layer, a phase transition temperature of the liquid crystal layer is about 85° C. to about 110° C., and an elastic coefficient of the liquid crystal is about 14 to 19 at 30° C. That is, an example of the present invention includes the liquid crystal having a high phase transition temperature.

Referring to FIG. 4, black luminance to a ratio of an alignment layer for a pixel electrode, according to an exemplary embodiment of the present invention, will be described. In detail, a case 1) where a phase transition temperature is 75° C. and an elastic coefficient at 30° C. is 11.8, a case 2) where a phase transition temperature is 85° C. and an elastic coefficient at 30° C. is 14.3, and a case 3) where a phase transition temperature is 110° C. and an elastic coefficient at 30° C. is 17.9 will be described. Referring to FIG. 4, even in each case, commonly, it is verified that as a thickness ratio of the alignment layer for the pixel electrode increases, the black luminance decreases. However, even in the case where the thickness ratio increases, black luminance of a liquid crystal layer having a high phase transition temperature is higher than black luminance of a liquid crystal layer having a relatively low phase transition temperature.

Such a characteristic is illustrated in FIG. 5, and the liquid crystal layer having a high phase transition temperature has higher black luminance than the liquid crystal layer having a low phase transition temperature, no matter which thickness ratio has any value. This represents that in the case where a phase transition temperature is high, even though any other conditions are changed, the black luminance relatively increases.

Further, referring to FIG. 6, black luminance for a thickness of the pixel electrode according to an exemplary embodiment of the present invention will be described. In FIG. 6, a liquid crystal layer having an elastic coefficient at 30° C. is 17.9 is experimented with pixel electrodes of different thicknesses (450 Å, 650 Å, and 850 Å).

Commonly, it is verified that as a thickness of an alignment layer for a pixel electrode increases, the black luminance is degraded. However, in the case where a percentage of the thickness ratio of the alignment layer to the pixel electrode is 200 or more, the thickness ratio is satisfied, and as a result, a particular effect is not shown.

Further, in each case, as the thickness of the pixel electrode is decreased, low black luminance is shown. That is, a case where the thickness of the pixel electrode is 450 Å has the lowest black luminance, and next, a case where the thickness of the pixel electrode is 650 Å and a case where the thickness of the pixel electrode is 850 Å have higher black luminances in sequence.

Accordingly, referring to FIGS. 4 to 6, in the case where the thickness of the alignment layer to the pixel electrode is uniform, for a low black luminance, the thickness of the pixel electrode may be 450 Å or less, and in the case where the thickness ratio of the alignment layer to the pixel electrode may be changed, when the thickness ratio is 1.4 to 2.0, it is effective to reduce black luminance and increase a contrast ratio.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a gate line disposed on the first substrate;
a data line disposed on the first substrate and crossing the gate line;
a first passivation layer disposed on the gate line and the data line;
a pixel electrode disposed on the first passivation layer;
an alignment layer disposed on the pixel electrode;
a second substrate facing the first substrate; and
a liquid crystal layer disposed between the first substrate and the second substrate,
wherein:
a phase transition temperature of the liquid crystal layer is in a range of about 85° C. to about 110° C.;
a thickness ratio of the alignment layer to the pixel electrode is in a range of about 1.4 to about 2.0; and
a black luminance of the liquid crystal display is in a range of 0.14 to 0.16.

2. The liquid crystal display of claim 1, wherein an elastic coefficient of the liquid crystal layer is in a range of 14 to 19, at 30° C.

3. The liquid crystal display of claim 1, wherein:
the pixel electrode comprises a first subpixel electrode and a second subpixel electrode that are disposed on opposite sides of the gate line; and
the liquid crystal display further comprises a first capacitor connected to the first subpixel electrode and a second capacitor connected to the second subpixel electrode.

4. The liquid crystal display of claim 3, further comprising transistors configured to charge different voltages in the first and second capacitors.

5. The liquid crystal display of claim 1, wherein the pixel electrode comprises a stem and branches extending from the stem.

6. The liquid crystal display of claim 1, further comprising a thin film transistor connected to the gate line and the data line.

7. The liquid crystal display of claim 6, wherein:
the pixel electrode comprises a first subpixel electrode and a second subpixel electrode that are spaced apart from each other with the gate line disposed therebetween; and
the thin film transistor comprises a first thin film transistor connected to the first subpixel electrode and a second thin film transistor connected to the second subpixel electrode.

8. The liquid crystal display of claim 6, wherein the first subpixel electrode and the second subpixel electrode each comprise a stem and branches extending from the stem.

9. The liquid crystal display of claim 1, further comprising a planar common electrode disposed on the second substrate.

10. The liquid crystal display of claim 1, further comprising a color filter disposed between the first passivation layer and the pixel electrode.

11. The liquid crystal display of claim 10, further comprising a light blocking member disposed on the second substrate, wherein the color filter and the light blocking member are partially overlapped with each other.

12. A liquid crystal display, comprising:
a first substrate;
a gate line disposed on the first substrate;
a data line disposed on the first substrate and crossing the gate line;
a first passivation layer disposed on the gate line and the data line;
a pixel electrode disposed on the first passivation layer;
an alignment layer disposed on the pixel electrode;
a second substrate facing the first substrate; and
a liquid crystal layer disposed between the first substrate and the second substrate,
wherein:
a phase transition temperature of the liquid crystal layer is in a range of about 85° C. to about 110° C.;
a thickness of the pixel electrode is about 450 Å;
a thickness ratio of the alignment layer to the pixel electrode is about 1.2; and
a black luminance of the liquid crystal display is in a range of 0.14 to 0.16.

\* \* \* \* \*